May 9, 1967  J. A. MACLAM ET AL  3,318,283
CAKE CIRCLE
Filed March 4, 1965
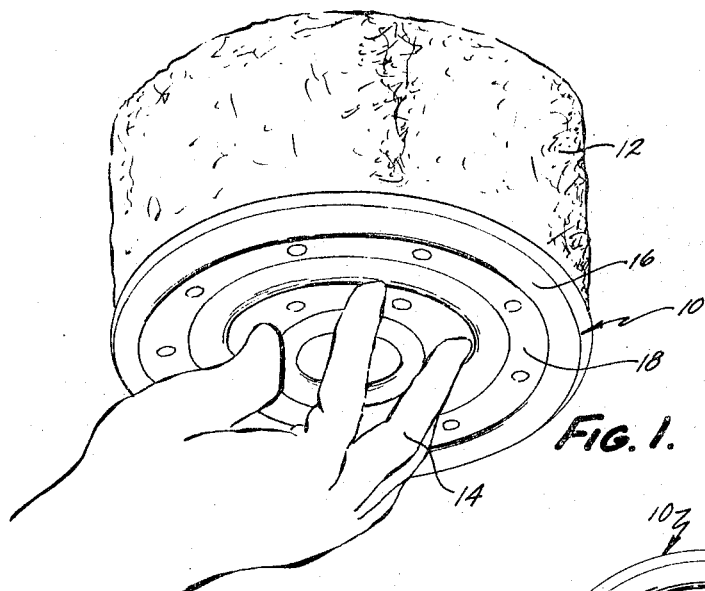
FIG. 1.
FIG. 2.
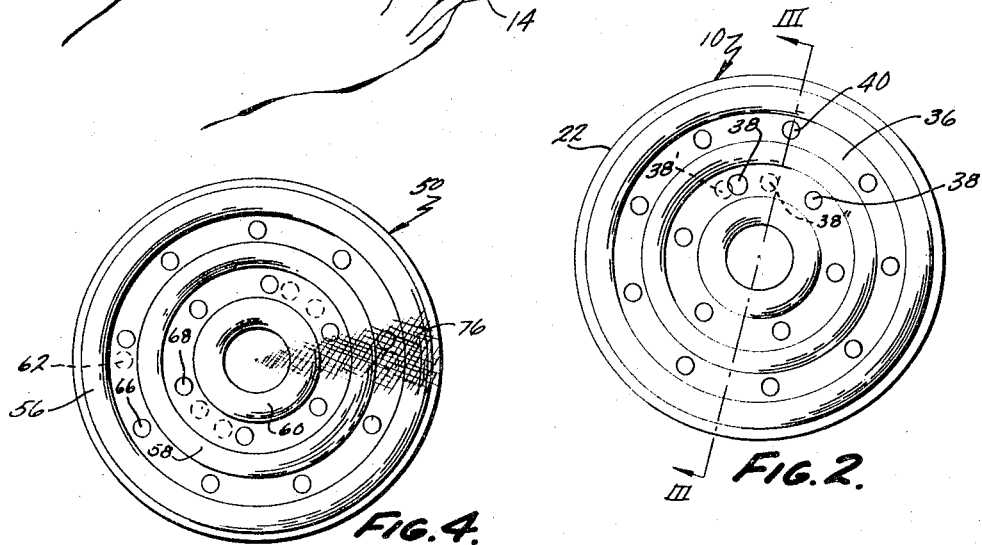
FIG. 4.
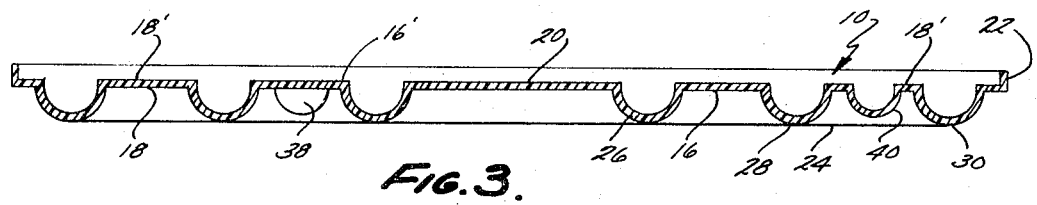
FIG. 3.
INVENTORS
ROBERT E. O'BRIEN
JAMES A. MACLAM
BY
*Price & Heneveld*
ATTORNEYS

United States Patent Office 3,318,283
Patented May 9, 1967

3,318,283
CAKE CIRCLE
James A. Maclam, Comstock Park, and Robert E. O'Brien, Grand Rapids, Mich., assignors to Kirkhof Manufacturing Corporation, Grand Rapids, Mich., a corporation of Michigan
Filed Mar. 4, 1965, Ser. No. 437,187
4 Claims. (Cl. 118—500)

This invention relates to circular disposable platters used to support commercially baked cakes, commonly called "cake circles," and more particularly relates to a vacuum formed polymeric cake circle. The term vacuum forming is commonly used in this art to conveniently refer to pressure differential forming in general. Thus the term vacuum is used for convenience herein also, but is intended in this broad sense.

Cake circles commonly used today constitute flat, circular, cardboard disks. Cake circles not only support the bakery cakes when offered for sale, usually in packages, but also frequently support the cakes when being frosted. Frequently, these bakery cakes are hand frosted by experts who support and "twirl" the cake by rotating the cake circle on the finger tips of one hand while applying frosting with the other hand. A waterproofing coating is applied to the coardboard surfaces to prevent moisture transfer to the cake circle, either from the cake or from the surface upon which the cake circle may be placed. Cardboard cake circles are very tricky to handle and twirl, as will be readily realized, because the coated surfaces are smooth and slippery, so that the finger tips tend to slip rather than making a good frictional contact. Further, completely uniform application of frosting is difficult to achieve when twirling a cake on these smooth cardboard disks since it is practically impossible to obtain and maintain a uniform rate of twirling while the frosting applicator is applying a dragging action on the cake.

It is an object of this invention to provide a novel cake circle disk that is vacuum formed of moisture repellant polymeric sheet material, and that actually enables excellent finger control for twirling. The disk has unique finger receiving guide and retention tracks that prevent side slippage of the cake circle during twirling and frosting application. The portions defining the edges of the track also simultaneously form a support surface area for the disk to support the cake in an elevated position, and also provided strengthening ribs for the disk.

Another object of this invention is to provide a polymeric cake circle having unique knurled, high friction surfaces, including the finger track surfaces, to thereby provide excellent frictional engagement for the fingers, while also effecting overall strengthening of the sheet material forming the circle.

Another object of this invention is to provide a cake circle with annular finger receiving tracks and special finger drive and index cogs in these tracks to enable uniform rotational rates when twirling and frosting the cake.

Another objects of this invention is to provide a novel polymeric, vacuum formed, configurated cake circle having special spaced index cogs that also serve as stacking lugs enabling a plurality of the circles to be stacked in uniformly spaced manner that prevents tight internesting. Therefore, each cake circle can be easily and quickly picked off the top of the stack for placement under a cake.

These objects of this invention will become apparent upon studying the following specification in conjunction with the drawings, in which:

FIG. 1 is a perspective view showing typical use of the novel cake circle supporting a cake and positioned on the end of a person's fingers for twirling;

FIG. 2 is a plan view of the top of the cake circle in FIG. 1;

FIG. 3 is a sectional view of the cake circle in FIG. 2, taken on plane III—III;

FIG. 4 is a plan view of the novel die used to form the novel cake circle.

Referring now specifically to the drawings, the novel cake circle 10 is shown in FIG. 1 supporting a cake 12 that is to be frosted. The cake and cake circle are supported on and to be twirled by the tips of the fingers 14 of a person's hand. The twirling is accomplished by "walking" one's fingers in a circular path along one of the special, annular, finger-receiving guide and retention tracks 16 or 18 concentric with the center of the cake circle.

The basic portions of the novel cake circle 10 are in spaced planes. The upper plane cake supporting surface 20 constitutes the major plane. In fact, this is the plane of the sheet of polymeric materials which is subsequently vacuum formed as described hereinafter. Integrally connected to this surface is an upstanding, peripheral, cake retaining ridge or flange 22 around the disk. This vertical flange not only serves to prevent cake slippage, but also helps prevent flexing of the disk by its rigidifying action.

The bottom support surface area 24 of the circle is formed by the cooperative effect of the plurality (here three) of annular depressed ribs 26, 28 and 30 which are concentrically oriented on the circular element. Each of the ribs has a substantially semi-circular cross section at any radial portion as seen from FIG. 3. The bottoms of the ribs are in a common plane to form the support surface upon which the circle rests. The cake can, therefore, be supported in an elevated manner. The ribs also provide three dimensional curvature to the plastic disk, thereby effecting structural stability and strength to the unit even though it is merely vacuum formed of thin plastic material a few thousandths of an inch thick.

The plastic material may be any of several known suitable vacuum formable thermoplastic materials. It is preferably a rubber modified, high impact polystyrene. When of this material, a thickness of about 7½ mils has been found to be completely satisfactory.

The ribs perform several functions simultaneously, including the two mentioned ones of: elevating the cake support surface, and providing strength for the cake circle to enable it to support a cake thereon, even when suspended only on a few contacts areas on a person's fingers, and a third function of: forming the two annular finger-receiving tracks 16 and 18. The particular track which a skilled person might use will depend largely upon the size of his hand. Each track 16 and 18 is of sufficiently radial width to readily receive the ends of a person's fingers (as shown in FIG. 1) with substantial clearance on each side. The side walls of the ribs straddling each annular track prevent the disk from sliding sideways off the fingers when the cake is being twirled by or advancing the fingers in sequential fashion along the surface to rotate the disk and cake.

Although the thermoplastic sheet material is initially of a very smooth surface, the finished cake circle is provided with an excellent frictional relationship with the ends of the fingers due to a special roughened, knurled characteristic formed into its surface. This roughened characteristic, illustrated for example at 36 in FIG. 2, has a mesh-type appearance with criss-cross lines. This mesh pattern is formed into the very body of the thin polymeric sheet material by a novel die to be described hereinafter. The mesh pattern is preferably applied over the entire surface of the cake circle, except the peripheral upstanding rim 22 and the plurality of special dimples 38 and 40 arranged in two annular rows. The knurled surface gives good frictional driving contact to the finger tips. It also helps strengthen the article considerably.

Dimples 38 and 40 are depressed into the two respective finger receiving tracks 16 and 18. Each is of hemispherical configuration. They are oriented in the center of the respective tracks and spaced at equal intervals around the track. These dimples serve a multiple function. One purpose is to constitute drive cogs to enable the operator's fingers to engage them successively and drivingly rotate the disk. Another correlated purpose is to serve as index means to contact the "walking" finger tips and enable the disk to be uniformly rotated for uniform application of frosting. It will be understood that these driving and indexing functions take place at the same time. Using these dimple cogs, the frosting applicator can rapidly, repeatedly rotate the cake circle at a constant rate by having some fingers repeatedly abutting the front side of some dimples for indexing, and other fingers repeatedly engaging the back side of the dimples to drive the disk in its rotative pattern.

The bottom ends of these dimples terminate short of the lower support surface area 24. This enables a plurality of the circles to effectuate optimum stacking relationship. That is, the circles fit slightly within each other to stack nicely, but do not internest completely to complicate removal of one disk at a time. The dimples are preferably not directly above each other, but are stepped slightly radially, about 5°, as illustrated by the phantom dimples 38' or 38'' in FIG. 2 for example, to offset them and serve as stacking lugs abutting the top surfaces 18' and 16' above the track surfaces. The circles are thus spaced slightly for easy grasping of the top one.

The novel cake circle is attractive, has many useful characteristics not at all found in prior cake circles, and furthermore, can even be relatively inexpensively formed by using vacuum forming techniques.

The novel cake circle resulting is far superior to the straight flat, disk-shaped, smooth surface cardboard cake circles used heretofore, while being economically competitive therewith.

Certain additional advantages not specifically recited above may occur to those in the art upon studying the foregoing invention. Also, it is conceivable that certain structural modifications within the concepts presented may be made without departing from the invention. Hence, the invention is intended to be limited only by the scope of the appended claims and the reasonably equivalents thereto.

We claim:
1. A cake circle comprising: a polymeric disk having a cake receiving surface, and a plurality of concentric strengthening ribs depressed thereinto to cooperatively form an underlying support surface; said ribs being spaced to form annular finger-receiving track means therebetween on the disk underside; and a plurality of spaced, projecting, finger-drive and indexing cogs in said track between said ribs.

2. A cake circle comprising: a polymeric disk having a cake receiving surface, and a plurality of concentric strengthening ribs depressed thereinto to cooperatively form an underlying support surface; said ribs being spaced to form at least one annular, finger-receiving track therebetween on the disk underside; and said track having a roughened knurled surface characteristic, for greater friction and strengthening.

3. A cake circle comprising: a polymeric disk having a cake receiving surface, and a plurality of concentric ribs depressed thereinto to cooperatively form an underlying support surface; said ribs being spaced to form annular, finger-receiving track means therebetween on the disk underside; said disk underside having a roughened knurled surface characteristic, for friction and strengthening; and a plurality of spaced, projecting, finger-drive and indexing cogs in said track between said ribs.

4. A cake disk comprising: a circular polymeric disk having its major surfaces in spaced planes; a cake receiving surface in a first plane; an upstanding cake retaining peripheral rim extending from said surface; a plurality of concentric ribs depressed into said cake receiving surface and cooperatively forming an underlying support surface in a second plane parallel to the first; each of said ribs having a semi-circular cross section at any radial portion; said disk having annular finger receiving tracks on its underside between said ribs to allow finger twirling of the disk and a cake thereon; a plurality of dimples depressed from said cake support surface, between said ribs and into said tracks, at equally spaced intervals; said dimples forming driving and indexing cogs, the ends of which terminate short of said underlying support surface to form stacking lugs for a plurality of disks; and said track and rib surfaces having a knurled roughened surface effecting strengthening of said disk and providing frictional finger engagement for twirling.

References Cited by the Examiner

UNITED STATES PATENTS

| 126,253 | 4/1872 | Bernard | 312—351 X |
| 424,028 | 3/1890 | Sautter | 248—346.1 |
| 2,589,967 | 3/1952 | Sawyer | 215—100.5 |
| 2,784,577 | 3/1957 | Beaham. | |
| 2,792,583 | 5/1957 | Alfano | 15—209.51 |
| 2,878,932 | 3/1959 | Martire | 206—72 |
| 3,074,206 | 1/1963 | Fischl-Bernfi et al. | 46—64 X |
| 3,229,810 | 1/1966 | Goller et al. | 248—346.1 X |

FOREIGN PATENTS 191,611  1/1923  Great Britain.

MORRIS KAPLAN, *Primary Examiner.*